United States Patent
Sears

[11] Patent Number: 5,530,321
[45] Date of Patent: Jun. 25, 1996

[54] POWER SUPPLY FOR A GAS DISCHARGE LAMP

[76] Inventor: Lawrence M. Sears, 45006 Mather La., Hunting Valley, Ohio 44022

[21] Appl. No.: 391,217

[22] Filed: Feb. 21, 1995

[51] Int. Cl.$^6$ .................................................. H05B 41/16
[52] U.S. Cl. ......................... 315/283; 315/282; 315/291; 315/308; 315/224; 315/DIG. 5; 315/DIG. 7; 315/209 R
[58] Field of Search ............................. 315/209 R, 224, 315/200 R, 226, 219, 307, 308, 291, DIG. 2, DIG. 5, DIG. 7, 276, 282, 283, 284

[56] References Cited

U.S. PATENT DOCUMENTS

| | | | |
|---|---|---|---|
| 4,051,411 | 9/1977 | Knoble et al. | 315/205 |
| 4,066,931 | 1/1978 | Morrill | 315/241 R |
| 4,158,793 | 6/1979 | Lewis | 315/101 |
| 4,215,292 | 7/1980 | Inui et al. | 315/98 |
| 4,234,822 | 11/1980 | Garrison et al. | 315/209 R |
| 4,248,195 | 2/1981 | Gorille | 315/209 T X |
| 4,251,752 | 2/1981 | Stolz | 315/DIG. 7 X |
| 4,277,726 | 7/1981 | Burke | 315/98 |
| 4,277,728 | 7/1981 | Stevens | 315/307 |
| 4,630,005 | 12/1986 | Clegg et al. | 315/DIG. 7 X |
| 4,904,903 | 2/1990 | Pacholok | 315/209 R |
| 4,937,501 | 6/1990 | Ganser et al. | 315/209 R |
| 5,051,666 | 9/1991 | Jensen | 315/307 |
| 5,053,680 | 10/1991 | Luursema | 315/209 R |
| 5,144,204 | 9/1992 | Nerone et al. | 315/209 R |
| 5,164,638 | 11/1992 | Denneman et al. | 315/224 |
| 5,293,077 | 3/1994 | Seki et al. | 315/209 R X |
| 5,343,122 | 8/1994 | Sugimori et al. | 315/209 R |
| 5,345,148 | 9/1994 | Zeng et al. | 315/209 R |

*Primary Examiner*—Robert Pascal
*Assistant Examiner*—Haissa Philogene

[57] ABSTRACT

A DC power supply for a gas discharge lamp includes a high voltage starting circuit for supplying high voltage pulses to effect initial energization of a gas discharge lamp, a lower voltage running circuit for supplying a desired average lamp operating current at a substantially constant current to the gas discharge lamp, and a transformer having a primary connected in the high voltage starting circuit and a secondary connected in the lower voltage running circuit. The transformer provides an inductance which acts as a current source inductor to supply current to the gas discharge lamp.

24 Claims, 2 Drawing Sheets

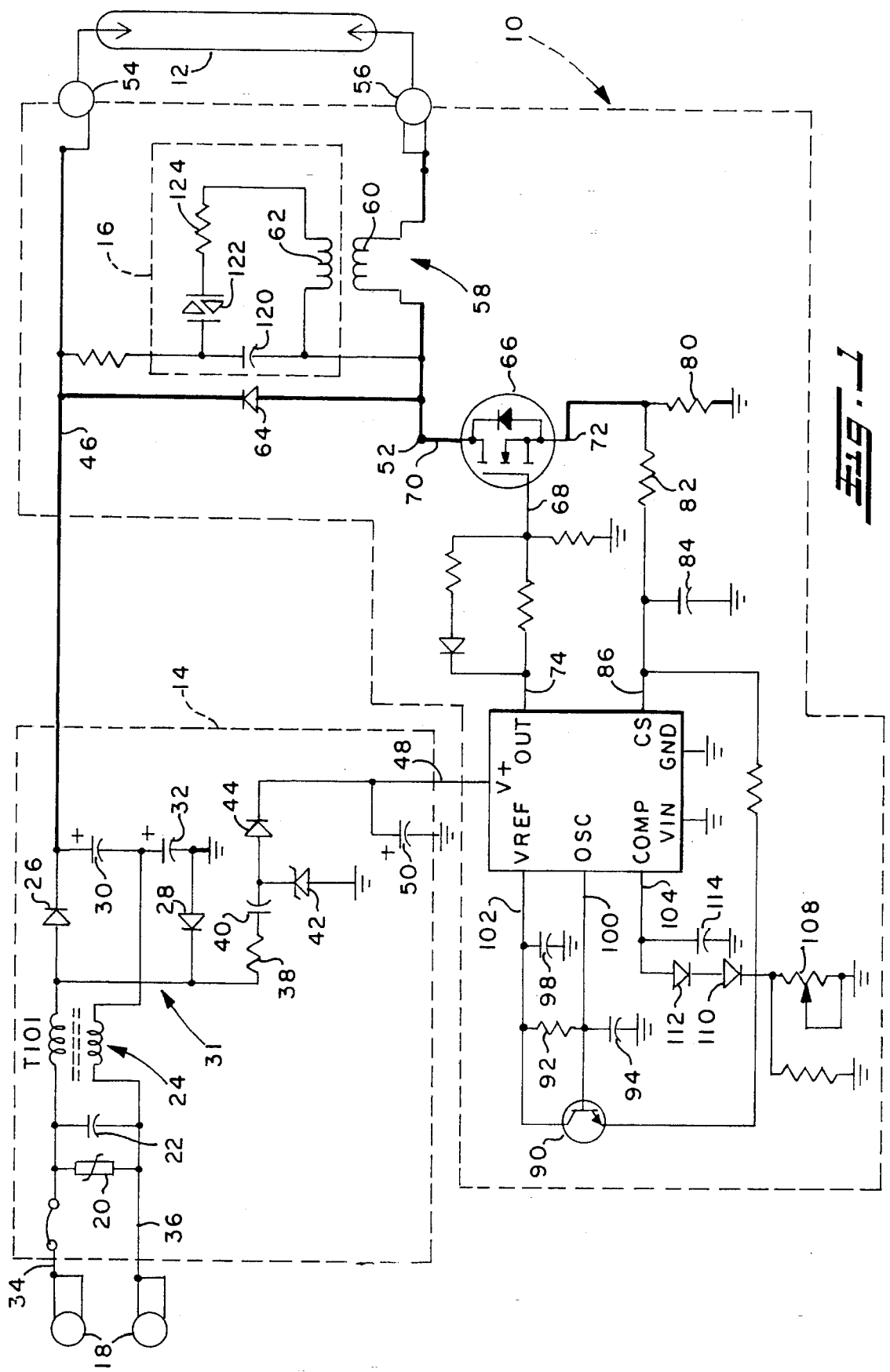

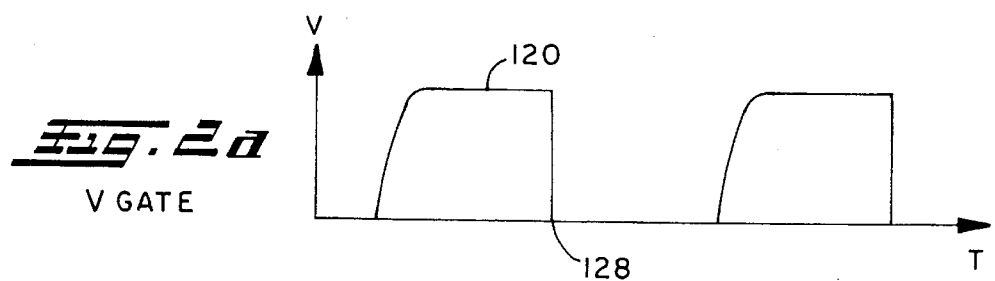
Fig. 2a V GATE
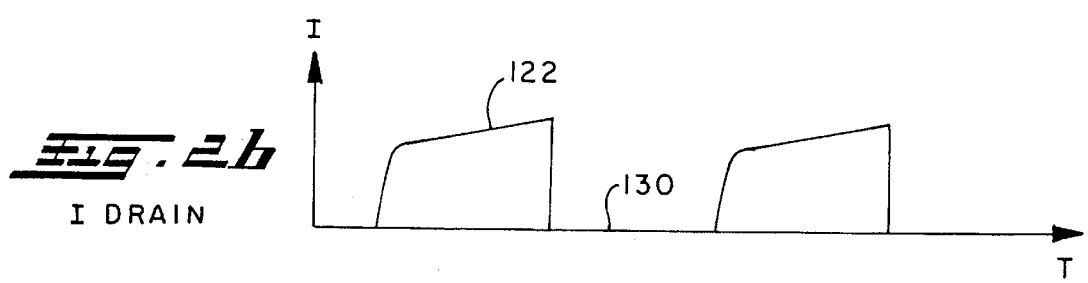
Fig. 2b I DRAIN
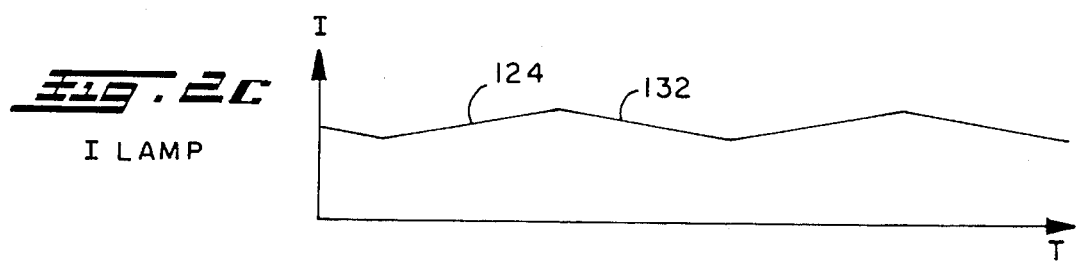
Fig. 2c I LAMP
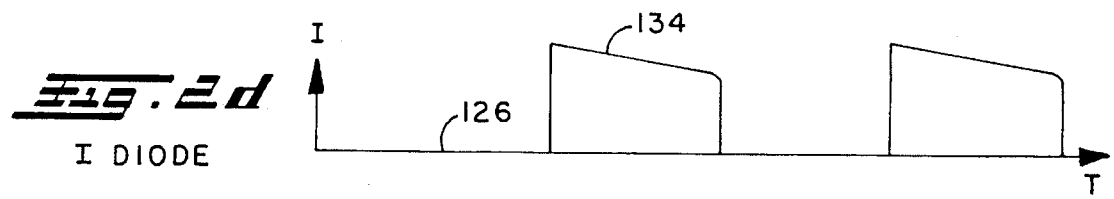
Fig. 2d I DIODE 5,530,321

POWER SUPPLY FOR A GAS DISCHARGE LAMP

DESCRIPTION—TECHNICAL FIELD

The present invention relates to a power supply for supplying DC power at a substantially constant current to a gas discharge lamp and, more particularly, to a power supply which includes an inductor which is series connected to the gas discharge lamp and which provides a current source for the gas discharge lamp.

BACKGROUND OF THE INVENTION

Power supplies, or ballasts, are known for gas discharge lamps. The known power supplies which provide a constant current for powering a gas discharge lamp are large, include many components, and are expensive. The present invention overcomes the disadvantages associated with the prior art by providing a compact, relatively inexpensive power supply for a gas discharge lamp which minimizes the components associated with the circuitry while providing both a high voltage starting circuit and a lower voltage running circuit for the gas discharge lamp.

SUMMARY OF THE INVENTION

The present invention provides a new and improved power supply for applying DC voltage at a substantially constant current for powering a gas discharge lamp. The power supply includes a pair of DC input terminals connected to a power source, a pair of DC output terminals operatively connected to the input terminals and adapted to have a gas discharge lamp connected therebetween, an inductance series connected with the gas discharge lamp, a diode disposed parallel to the inductance and the gas discharge lamp, and switch means connected to the diode for controlling the current to the gas discharge lamp to provide a desired average lamp operating current at substantially constant current to the gas discharge lamp. The switch means, when conductive, effecting a substantially constant current flow through the gas discharge lamp and charging of the inductance. The switch means, when nonconductive, effecting a substantially constant current flow through the gas discharge lamp as the inductance, which acts as a current source, discharges through the diode and the gas discharge lamp.

Still another provision of the present invention is to provide a power supply for supplying a substantially constant current to a gas discharge lamp, including a pair of input terminals connected to a DC power source, a pair of output terminals operatively connected to the input terminals and adapted to having a DC lamp connected thereto, an inductor series connected with the gas discharge lamp, a diode parallel connected to the gas discharge lamp and the inductor, and switch means for effecting a substantially constant current flow through the gas discharge lamp. The inductor charges when the switch means is conductive and discharges through the diode means and gas discharge lamp when the switch means is nonconductive. The inductor act as a current source for providing current to the gas discharge lamp when the switch means is nonconductive.

A still further provision of the present invention is to provide a new and improved DC power supply for a gas discharge lamp, including a high voltage starting circuit for supplying high voltage pulses to effect initial energization of the gas discharge lamp, a lower voltage running circuit for supplying a substantially constant current to the gas discharge lamp, and a transformer having a primary connected in the high voltage starting circuit and a secondary connected in the lower voltage running circuit.

Still another provision of the present invention is to provide a new and improved DC power supply as set forth in the preceding paragraph wherein the high voltage starting circuit includes a capacitor and a passive switch which are series connected with the primary of the transformer and wherein upon initial energization of the gas discharge lamp, the capacitor is charged to the trigger voltage of the passive switch means which then conducts to apply the high voltage charge on the capacitor to the primary of the transformer, which subsequently steps up the voltage and applies to the secondary of the transformer a high voltage pulse to effect initial energization of the gas discharge lamp.

BRIEF DESCRIPTION OF THE DRAWINGS

FIG. 1 is a circuit diagram of the DC power supply for a gas discharge lamp of the present invention.

FIG. 2a is a graphical representation of the voltage at the gate 68 of the power FET 66.

FIG. 2b is a graphical representation of the current at the drain 70 of the power FET 66.

FIG. 2c is a graphical representation of the lamp current.

FIG. 2d is a graphical representation of the current through the diode 64.

DESCRIPTION OF THE PREFERRED EMBODIMENT

Referring to the Figures and, more particularly, to FIG. 1, a power supply 10 for supplying DC voltage at a substantially constant current for powering a gas discharge lamp 12 is illustrated. Gas discharge lamps such as sodium, metal halide, arc lamps and mercury vapor lamps can be started and run with the power supply 10 of the present invention. A rectifier/filter 14 is provided for converting AC voltage to DC to provide a power source for the DC power supply 10 and to power the solid state components of the power supply 10. The DC power supply 10 further includes a high voltage starting circuit 16 for supplying high voltage pulses to effect initial energization of the gas discharge lamp and a lower voltage running circuit which is adapted to supply a substantially constant current to the gas discharge lamp 12 after the lamp 12 has been started by the high voltage starting circuit 16. While the lower voltage running circuit has not been specifically identified in-FIG. 1, it comprises substantially all of the elements of the DC power supply 10 with the exception of the circuit elements disposed within the high voltage starting circuit 16.

The gas discharge lamp 12 requires a substantially constant current to run lamp 12 after the lamp is initially started. The power supply 10 supplies a substantially constant current to the gas discharge lamp 12 which, as seen in FIG. 2c and as will be more fully explained hereinafter, is not constant but rather includes a ripple content which should be less than 20%. However, the average current supplied to lamp 12 will be substantially constant. As used herein, "substantially constant current" means current having a ripple content of less than 20% and which has a substantially constant average value which varies less than 10%.

The rectifier/filter 14 includes a pair of input terminals 18 which are adapted to be connected to a source of AC power. The AC power is directed along lines 34 and 36 to a common mode choke 24. A metal oxide varistor 20, a capacitor 22, and a common mode choke 24, are connected across lines 34 and 36 and provide transient protection and filter EMI from the circuit. The AC power is directed to rectifier 31 which includes a pair of diodes 26 and 28. A pair of capacitors 30 and 32 are connected across the rectifier 31 to filter the DC output of the rectifier 31.

The output of the rectifier 31 is directed to an input terminal 46 of the DC power supply 10 and to a low voltage logic power supply which provides low voltage power for powering the solid state circuitry of the DC power supply 10. The low voltage logic power supply includes resistor 38, capacitor 40, zenor diode 42, diode 44 and filter capacitor 50. The low voltage logic power supply provides a low voltage at terminal 48 which powers the solid state components of the power supply 10. Terminal 48 is provided with low voltage, approximately 15 volts, to power an integrated circuit 78, as will be more fully explained hereinafter.

The DC power supply 10 includes a pair of input terminals 46 and 52 which are connected to the power supply 14 and to ground. A pair of output terminals 54 and 56 is provided and the high voltage discharge lamp 12 is adapted to be connected therebetween.

A transformer, which in the preferred embodiment is a step-up transformer 58, is located in the DC power supply 10. The transformer 58 includes a primary 62 and a secondary 60. The secondary of transformer 58 is series connected with the gas discharge lamp 12 and acts as a current source inductor when the lamp is on for providing current to the gas discharge lamp 12, as will be described more fully hereinafter. A diode 64 is series connected with the secondary 60 of transformer 58 and the gas discharge lamp 12. A switching means 66, which in the preferred embodiment is a power FET 66, is connected to the diode 64 for controlling the current to the gas discharge lamp 12. Power FET 66 includes a gate 68 which is connected to an output terminal 74 of the integrated circuit 78, a drain 70 which is connected to the diode 64, and a source 72 which is connected to ground via a resistor 80. When the lamp 12 is on and power FET 66 is conductive, the anode of diode 64 will be grounded, diode 64 will be prevented from conducting, and a voltage will be impressed across the gas discharge lamp 12 and the inductor 60 to produce a current through the lamp 12 and inductor 60 which will have a slightly positive slope (see FIG. 2cat 124). When power FET 66 is conducting, the secondary 60 of transformer 58 which acts as an inductor, will be charged. When the power FET 66 is non-conductive, the anode of diode 64 will now be positive, diode 64 will conduct, and the secondary 60 of transformer 58 will act as a current source and will discharge through the diode 64 and the gas discharge lamp 12 to provide a current to the gas discharge lamp 12 with a small negative slope (see FIG. 2cat 132).

The duty cycle of the power FET 66 is controlled by the integrated circuit 78 to control the current through the gas discharge lamp 12. The integrated circuit 78 is preferably a UC3843 and functions to control the duty cycle of the power FET 66 to provide the desired average current to the gas discharge lamp 12. The desired average lamp operating current is dependent upon the lamp requirements and in the preferred embodiment is preset. The integrated circuit 78 is powered via the input terminal 48 from the power supply 14. A resistor 80, which is connected to the source 72 of the power FET 66, functions as a current sense resistor and provides a current feedback signal through a resistor 82 and a capacitor 84 to a current sense input terminal 86 of the integrated circuit 78. The peak current sensed at the source 72 of the power FET 66 is approximately equal to the average value of the current through lamp 12. By sensing the FET source current, standard switching topography can be utilized by the integrated circuit 78 to sense lamp 12 current to thereby control the duty cycle of the FET 66. This provides a distinct advantage over trying to sense the current flow through the lamp 12 directly. The high voltage and high frequency present in the gas discharge lamp 12 complicates directly sensing the current through the lamp 12.

Integrated circuit 78 further includes terminal 102 at which a reference voltage is generated for use by the internal oscillator of integrated circuit 78 and transistor 90 when the lamp 12 is on, and a terminal 100 to which clock timing components are connected. Transistor 90 provides a slope compensation signal to enhance the stability of the integrated circuit 78. A resistor 92 and a capacitor 94 form an RC timing circuit to provide a clock signal to the oscillator input 100 of the integrated circuit 78. A capacitor 98 is provided to filter the voltage reference signal at 102.

The integrated circuit 78 is adapted to have a voltage reference signal applied at a terminal 104 which sets the peak current through the FET 66 and thus the average lamp current. A resistor 108, in conjunction with a current source internal to the IC 78, is adjusted to set the reference voltage at the input terminal 104. Diodes 110 and 112 provide temperature compensation for the integrated circuit 78. A bypass filter capacitor 114 is connected to the input terminal 104 to provide filtering of the reference signal.

A high voltage starting circuit 16 is provided in the DC power supply 10 to initially energize the gas discharge lamp 12. As is well known, initial energization of a gas discharge lamp requires a higher voltage than the voltage required to run the lamp after the lamp has been turned on. To this end, the high voltage starting circuit includes the primary 62 of the transformer 58, capacitor 120, passive switch means 122, and resistor 124, all of which are series connected with the primary 62 of the transformer 58. The passive switch means 122 in the preferred embodiment is a Sidac which becomes conductive when the capacitor 120 charges to the trigger voltage of the Sidac.

Upon initial energization of power supply 10, lamp 12 is off and does not provide a current path. Upon initial conduction of power FET 66, its drain current is 0 due to the lamp 12 being off, and capacitor 120 charges until it reaches the trigger voltage of the passive switch means Sidac 122. When capacitor 120 charges to approximately 200 volts, which in the preferred embodiment is the trigger voltage of the passive switch means 122, the capacitor 120 discharges through the Sidac 122 and resistor 124 through the primary 62 of transformer 58. Transformer 58 acts as a pulse transformer upon initial starting of lamp 12. The high voltage pulse is then stepped-up by the transformer 58 to several thousand volts and the high voltage pulse is directed through the secondary 60 of the transformer 58 which then discharges through the diode 64 and gas discharge lamp 12 to effect initial energization thereof. After gas discharge lamp 12 is turned on by a single or multiple high voltage pulse, a current path is provided therethrough and the voltage across the gas discharge lamp is less than the trigger voltage of the passive switch 122. After the lamp 12 is on, the capacitor 120, which is disposed in parallel to lamp 12, charges only to the voltage across the lamp 12, and thus capacitor 120 is prevented from charging to the trigger voltage of the passive switch 122 and firing the passive switch 122 when the gas discharge lamp 12 is on. While starting circuit 16 has been described as providing a high voltage pulse to start lamp 12, it should be realized that the starting circuit 16 may supply multiple pulses to effect starting of lamp 12. Capacitor 120 will continue to charge and fire Sidac 122 until lamp 12 is turned on, at which time capacitor 120 is prevented from charging to the trigger voltage of Sidac 12.

FIG. 2 illustrates the voltage at the gate of the power FET 66 at FIG. 2a, the current at the drain 72 of the power FET 66 in FIG. 2b, the lamp current through the lamp 12 in FIG. 2c, and the diode current in FIG. 2d. After the lamp 12 is initially turned on by the high voltage starting circuit 16, the signal to the gate 68 of FET 66 will be controlled to control the duty cycle of the FET to provide the desired average current at a substantially constant current to lamp 12. When the voltage at gate 68 goes high, as at 120 in FIG. 2a, FET 66 will conduct and the current through the drain 70 will increase, as at 122 in FIG. 2b, as the secondary of transformer 60 charges. At this time, the lamp current will have a slightly positive slope as the secondary 60 of transformer 58 charges, as at 124 in FIG. 2c, and diode 64 will be non-conductive due to the fact that it is now connected to ground 80 via the FET 66. The non-conduction of diode 64 is illustrated in FIG. 2d at 126. When the voltage on the gate 68 of FET 66 goes to 0, as at 128 in FIG. 2a, the diode 64 will immediately become conductive, as illustrated at 134 in FIG. 2d. This results in the drain current at the drain 70 of the FET 66 going to 0 as illustrated in FIG. 2b at 130. At this time, the secondary 60 of transformer 58 acts as a current source inductor to provide a current source for providing current to lamp 12. The current through lamp 12 is illustrated in FIG. 2c and 132 illustrates the decaying current as the inductance of secondary 60 of transformer 58 discharges through the diode 64 and lamp 12. While the lamp current is described as substantially constant, FIG. 2c illustrates that the lamp current has a ripple content due to the charging and discharging of inductor 60. The ripple is less than 20% and the average lamp operating current is substantially constant.

When FET 66 is turned on, it forces the current in diode 64 in the opposite direction to render diode 64 nonconductive, as at 126 in FIG. 2d. Diode 64 is preferably a fast reverse recovery diode which is constructed so that it can be quickly forced off without resulting in a large reverse current pulse. The reverse recovery time for diode 64 is indicated in FIG. 2a as TRR. It is desirable to turn on FET 66 slowly so that the reverse recovery time of the diode does not result in a large current pulse. If the FET 66 is rapidly turned on, the diode 64 and FET 66 would be stressed due to the large reverse current pulse. Accordingly, it is desired to turn the FET 66 on slowly as at 121 in FIG. 2a. However, it is desired to and turn FET 66 off quickly to minimize power losses in the FET 66 during turnoff. The turn on time is desired to be at least ten times greater than the turn off time to reduce stresses in the diode 64 and FET.

The integrated circuit 78 senses the current through the FET via resistor 80 and waits until the peak value is reached and then turns FET 66 off. The peak value of lamp current is set by resistor 108. The present construction allows for the use of inexpensive circuitry to provide a substantially constant current flow through the lamp 12 and minimizes the use of components to simplify and reduce the cost of the circuit. Ripple content of the current through lamp 12 should be negligible, preferably less than 20%, as illustrated in FIG. 2c, to prevent lamp operating difficulties.

From the foregoing, it should be apparent that a new and improved power supply for supplying substantially constant current for powering a gas discharge lamp 12 has been illustrated. The power supply includes a starting circuit 16 for starting the lamp 12 by supplying high voltage pulses to lamp 12. The power supply includes a pair of DC input terminals 46, 52, a pair of output terminals 54, 56 which are operatively connected to the input terminals and adapted to have a gas discharge lamp 12 connected therebetween. An inductance in the form of the secondary 60 of transformer 58 is connected to the gas discharge lamp 12 and a diode 64 is disposed parallel to the secondary 60 and the gas discharge lamp 12. A switch means such as the FET 66 is connected to the diode 64 for controlling the current through the gas discharge lamp 12 to provide a substantially constant current to the gas discharge lamp after the lamp 12 has been started. The switch means 66, when conductive, affecting a substantially constant current flow through the gas discharge lamp 12 from the input terminals 46, 52 and charging the secondary 60 of transformer 58. When the FET 66 is nonconductive, a substantially constant current flow is provided through the gas discharge lamp 12 as the secondary 60 of transformer 58 discharges through the diode 64 and the gas discharge lamp 12.

What we claim is:

1. A power supply for supplying DC voltage at a desired average lamp operating current at a substantially constant current for powering a gas discharge lamp comprising a pair of DC input terminals adapted to be connected to a power source, a pair of DC output terminals operatively connected to said input terminals and adapted to have a gas discharge lamp connected therebetween, an inductance series connected with the gas discharge lamp, diode means disposed parallel to said inductance and the gas discharge lamp, switch means connected to said diode means for controlling the current through the gas discharge lamp to provide a desired average lamp operating current at a substantially constant current to the gas discharge lamp, said switch means when conductive effecting a substantially constant current flow through the gas discharge lamp from said input terminals and effecting charging of said inductance, said switch means when non-conductive effecting a substantially constant current flow through the gas discharge lamp as said inductance discharges through said diode means and the gas discharge lamp.

2. A power supply for supplying DC voltage at a substantially constant current for powering a gas discharge lamp as defined in claim 1 wherein the current flow through said switch means is directly related to the current flow through the gas discharge lamp and further including current feedback means for sensing the current flow through said switch means and controlling the duty cycle of said switch means to provide a desired average lamp operating current at a substantially constant current through said gas discharge lamp.

3. A power supply for supplying DC voltage at a substantially constant current for powering a gas discharge lamp as defined in claim 2 wherein said inductance is the secondary of a step-up transformer.

4. A power supply for supplying DC voltage at a substantially constant current for powering a gas discharge lamp as defined in claim 3 further including a high voltage starting circuit for initially energizing the gas discharge lamp, said step-up transformer includes a primary which is disposed in said high voltage starting circuit for initially energizing the gas discharge lamp.

5. A power supply for supplying DC voltage at a substantially constant current for powering a gas discharge lamp as defined in claim 4 wherein said starting circuit further includes a capacitor and a passive switch means which are series connected with the primary of said step-up transformer and wherein upon initial energization of the switch means to an ON condition the capacitor is charged to the trigger voltage of said passive switch means which then conducts to apply the high voltage charge on the capacitor to the primary of the step-up transformer which subsequently steps up the voltage and applies, through the secondary of said step-up transformer, a high voltage pulse across the gas discharge lamp to effect initial energization thereof.

6. A power supply for supplying DC voltage at a substantially constant current for powering a gas discharge lamp as defined in claim 5 wherein the voltage across the gas discharge lamp when the lamp is on is less than the trigger voltage of said passive switch means to prevent the capacitor from charging to the trigger voltage of the passive switch means and firing the passive switch means when the gas discharge lamp is conducting.

7. A power supply for supplying DC voltage at a substantially constant current for powering a gas discharge lamp as defined in claim 1 further including current feedback means for controlling the duty cycle of said switch means in dependence upon the current through the gas discharge lamp to provide a desired average lamp operating current at a substantially constant current through the gas discharge lamp.

8. A DC power supply for supplying a substantially constant current to a gas discharge lamp comprising a pair of input terminals adapted to be connected to a DC power source, a pair of output terminals operatively connected to said input terminals and adapted to have a DC lamp connected thereto, an inductor series connected with the gas discharge lamp, diode means parallel connected to the gas discharge lamp and said inductor, and switch means for effecting a substantially constant current flow through the gas discharge lamp, said inductor charging when said switch means is conductive and discharging through said diode means and gas discharge lamp when said switch means is nonconductive, said inductor being a current source for providing a substantially constant current through the gas discharge lamp when said switch means is nonconductive.

9. A power supply for supplying DC voltage at a substantially constant current for powering a gas discharge lamp as defined in claim 8 wherein the current through said switch means is directly related to the current through the gas discharge lamp and further including current feedback means for sensing the current through said switch means and controlling the duty cycle of said switch means to provide a desired average lamp operating current at a substantially constant current through said gas discharge lamp.

10. A power supply for supplying DC voltage at a substantially constant current for powering a gas discharge lamp as defined in claim 8 wherein said inductor is the secondary of a step-up transformer.

11. A power supply for supplying DC voltage at a substantially constant current for powering a gas discharge lamp as defined in claim 9 further including a high voltage starting circuit for initially energizing the gas discharge lamp, and wherein said step-up transformer includes a primary which is disposed in said high voltage starting circuit for initially energizing the gas discharge lamp.

12. A power supply for supplying DC voltage at a substantially constant current for powering a gas discharge lamp as defined in claim 11 wherein said starting circuit further includes a capacitor and a passive switch means which are series connected with the primary of said step-up transformer and wherein upon initial energization of the switch means to an ON condition the capacitor is charged to the trigger voltage of said passive switch means which then conducts to apply the high voltage charge on the capacitor to the primary of the step-up transformer which subsequently steps up the voltage and applies, through the secondary of said step-up transformer, a high voltage pulse across the gas discharge lamp to effect initial energization thereof.

13. A power supply for supplying DC voltage at a substantially constant current for powering a gas discharge lamp as defined in claim 12 wherein said capacitor is disposed in parallel to said gas discharge lamp and the voltage across the gas discharge lamp when the lamp is on is less than the trigger voltage of said passive switch means to prevent the capacitor from charging to the trigger voltage of the passive switch means and firing the passive switch means when the gas discharge lamp is conducting.

14. A power supply for supplying DC voltage at a substantially constant current for powering a gas discharge lamp as defined in claim 8 wherein the peak current through said switch means is equal to the average value of the current through the gas discharge lamp.

15. A power supply for supplying DC voltage at a substantially constant current for powering a gas discharge lamp as defined in claim 8 further including current feedback means for controlling the duty cycle of said switch means in dependence upon the current through the gas discharge lamp to provide a desired average lamp operating current at a substantially constant current through the gas discharge lamp.

16. A DC power supply for a gas discharge lamp comprising a high voltage starting circuit for supplying high voltage pulses to effect initial energization of the gas discharge lamp, a lower voltage running circuit which is adapted to supply a desired average lamp operating current at a substantially constant current to the gas discharge lamp, and a transformer having a primary connected in said high voltage starting circuit and a secondary connected in said lower voltage running circuit which is adapted to supply a constant current to the gas discharge lamp.

17. A DC power supply for a gas discharge lamp as defined in claim 16 wherein said high voltage starting circuit includes a capacitor and a passive switch means which are series connected with the primary of said transformer and wherein upon initial energization of the gas discharge lamp, the capacitor is charged to the trigger voltage of said passive switch means, which then conducts to apply the high voltage charge on the capacitor to the primary of the transformer, which subsequently steps up the voltage and applies, through the secondary of the transformer, a high voltage pulse to the gas discharge lamp to effect initial energization thereof.

18. A DC power supply for a gas discharge lamp as defined in claim 17 wherein said lower voltage running circuit furthers includes a pair of DC input terminal adapted to be connected to a power source, a pair of DC output terminals operably connected to said input terminals and adapted to have the gas discharge lamp connected therebetween, said secondary of said transformer being series connected with the gas discharge lamp, diode means connected in parallel to said secondary of said transformer and the gas discharge lamp, switch means for controlling the current through the gas discharge lamp to provide a desired average lamp operating current at a substantially constant current through the gas discharge lamp, said switch means, when conductive, effecting a substantially constant current flow to the gas discharge lamp and effecting charging of said secondary of said transformer, said switch means when nonconductive, effecting a substantially constant current flow through the gas discharge lamp as the secondary of said transformer provides a current source as said secondary discharges through said diode means and the gas discharge lamp.

19. A DC power supply for a gas discharge lamp as defined in claim 16 wherein said lower voltage running circuit furthers includes a pair of DC input terminal adapted to be connected to a power source, a pair of DC output terminals operably connected to said input terminals and adapted to have the gas discharge lamp connected therebetween, said secondary of said transformer being series connected with the gas discharge lamp, diode means connected in parallel to said secondary of said transformer and the gas discharge lamp, switch means for controlling the current through the gas discharge lamp to provide a desired average lamp operating current at a substantially constant current to the gas discharge lamp, said switch means, when conductive, effecting a substantially constant current flow to the gas discharge lamp and effecting charging of said secondary of said transformer, said switch means when nonconductive, effecting a substantially constant current flow through the gas discharge lamp as the secondary of the transformer provides a current source as said secondary discharges through said diode means and the gas discharge lamp.

20. A DC power supply for a gas discharge lamp as defined in claim 18 wherein the current flow through said switch means is directly related to the current flow through the gas discharge lamp, and further including current feedback means for sensing the current flow through said switch means and controlling the duty cycle of said switch means to provide a desired average lamp operating current at a substantially constant current through said gas discharge lamp.

21. A DC power supply for a gas discharge lamp as defined in claim 19 wherein the current flow through said switch means is directly related to the current flow through the gas discharge lamp, and further including current feedback means for sensing the current flow through said switch means and controlling the duty cycle of said switch means to provide a desired average lamp operating current at a substantially constant current through said gas discharge lamp.

22. A DC power supply for a gas discharge lamp as defined in claim 18 wherein the peak current at said switch means is equal to the average value of the current through the gas discharge lamp.

23. A DC power supply for a gas discharge lamp as defined in claim 18 wherein the voltage across the gas discharge lamp when the lamp is on is less than the trigger voltage of said passive switch means to prevent said capacitor from charging to the trigger voltage of said passive switch means and firing said passive switch means when the gas discharge lamp is conducting.

24. A DC power supply for a gas discharge lamp as defined in claim 19 wherein said diode means is a reverse recovery diode and wherein the turn on time of said switch means is at least ten times greater than the turn off time of said switch means to minimize reverse recover current through said reverse recovery diode.

* * * * *